Nov. 28, 1933.  F. ADAMS  1,936,744
ELECTRIC MOTOR CONSTRUCTION
Filed Dec. 22, 1930  2 Sheets-Sheet 1
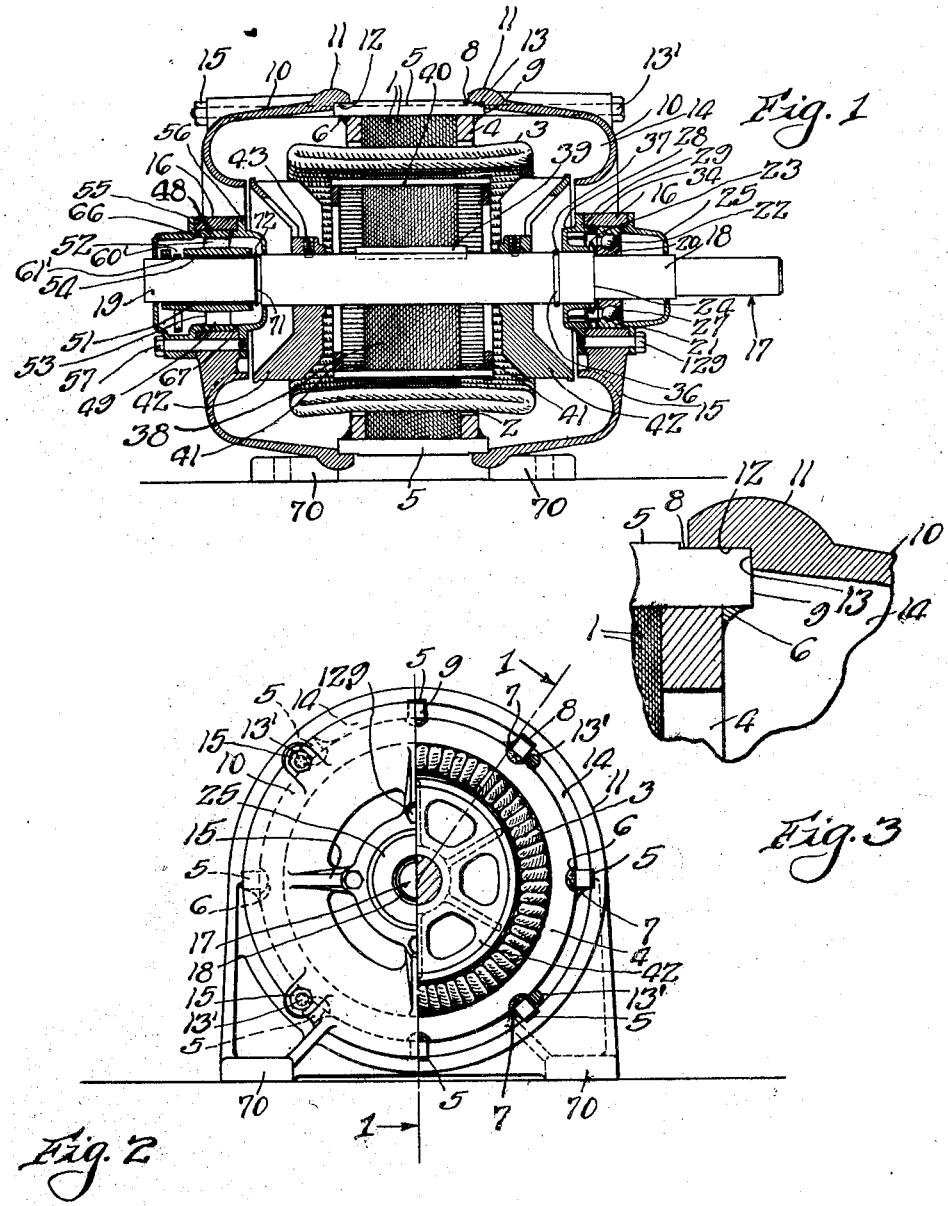
INVENTOR:
Frank Adams
BY Chas. M. Nissen
ATTORNEY.

Nov. 28, 1933.  F. ADAMS  1,936,744
ELECTRIC MOTOR CONSTRUCTION
Filed Dec. 22, 1930  2 Sheets-Sheet 2
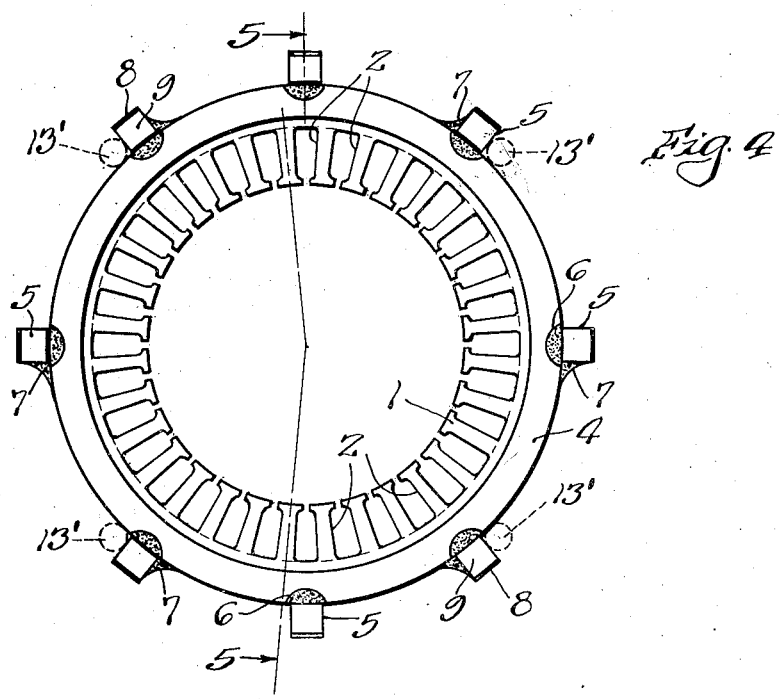
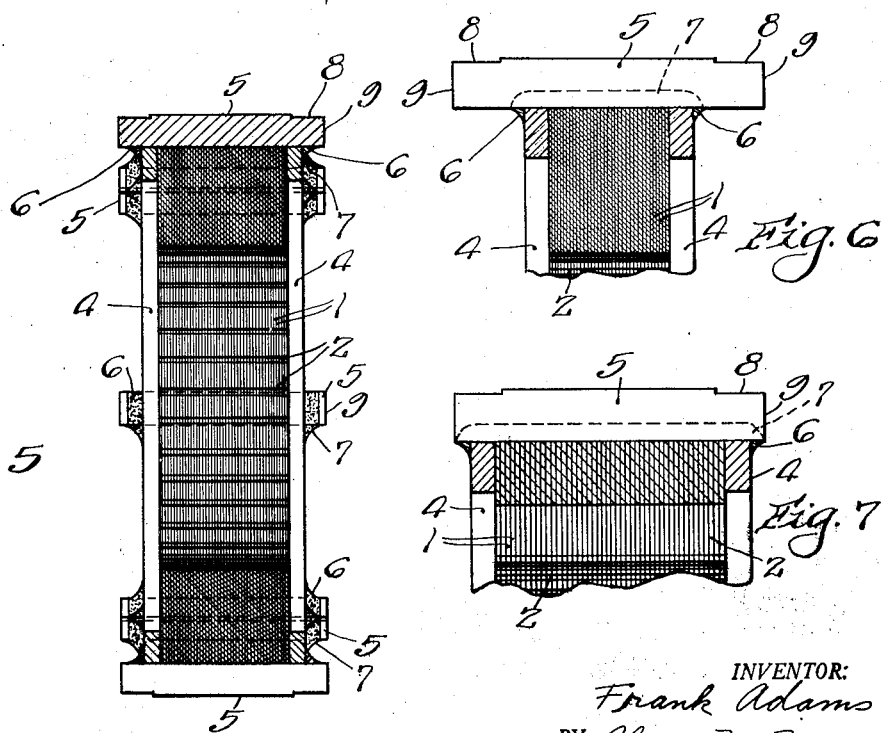
INVENTOR:
Frank Adams
BY Chas. M. Nissen
ATTORNEY.

Patented Nov. 28, 1933

1,936,744

UNITED STATES PATENT OFFICE 1,936,744

ELECTRIC MOTOR CONSTRUCTION

Frank Adams, Mansfield, Ohio, assignor to The Ideal Electric & Manufacturing Co., Mansfield, Ohio, a corporation of Ohio Application December 22, 1930
Serial No. 503,928

4 Claims. (Cl. 172—36)

The present invention relates to a motor assembly which is of a simplified form, is rugged and makes a more economical use of the non-active parts of the motor, namely, the frames and supporting members.

One object of this invention is to standardize motor assemblies in such a manner as to enable one to interchange the various parts of the machine quite readily and to use substantially the same overall sizes for the various units so that units may be interchanged for the purpose of increasing or decreasing the rating of the motor or to change certain of the parts to meet different requirements of use, or to meet various specifications.

Another object of this invention is to provide a motor unit which comprises bearing brackets which are in effect bearing supports or pedestals comparable to the bearing pedestals used on extremely heavy machinery. These bearing brackets are part of the motor and support the ring in such a manner that all operating stresses are effectively resisted.

Another object of this invention is to so construct the bearing brackets that either ball, roller or sleeve bearings may be mounted in this bracket without changes in the machinery or the bracket and without the necessity of dismantling the motor. In other words, a quick change may be made from a sleeve bearing to a roller bearing or ball bearing, or vice versa, without any great amount of trouble and with very little loss of time.

Another object of this invention resides in an improved form of stator construction which involves the clamping of the stator laminations by means of stator ribs or tie members and clamping rings, the tie members being welded to the clamping rings to thereby form a unitary construction which is very durable and resists the forces which tend to rotate the ring about its axis when the motor is operating.

In order to standardize production, I construct the laminated stator of an A. C. induction motor and the field ring of a D. C. dynamo or motor in such a manner that either one or the other may be used with the same set of end brackets. I also contemplate constructing a motor generator set by using two ring assemblies in alinement with each other and secured rigidly together by welding or like means and mounting the whole unit between end brackets which latter support the rotating element of the motor-generator.

Another object of this invention is to so arrange the tie members as to provide air circulating spaces when the motor is assembled.

Other objects of this invention will appear hereinafter as the description thereof proceeds, the novel features and arrangements of which are clearly set forth in the appended claims.

In the drawings—

Fig. 1 is a cross-section through a motor embodying my invention taken substantially along the line 1—1 of Fig. 2;

Fig. 2 is an end view of the motor shown in Fig. 1 with the right-hand half of the end bracket removed for the sake of clearness;

Fig. 3 is a fragmentary enlarged view of a part of the mechanism shown in Fig. 1;

Fig. 4 is a side elevational view of a stator embodying my invention;

Fig. 5 is a cross-section taken along the line 5—5 of Fig. 4;

Figs. 6 and 7 show modified arrangements of the stator which may be used with the same type clamping rings and tie members.

Before proceeding with a description of this invention, it is to be understood that the word "motor" is not to be construed as limiting my invention strictly to motors, and it will be understood that wherever applicable, it is to be considered that the construction described for a motor may also be used for constructing a generator. Furthermore, my machine is not limited to only A. C. machines or only D. C. machines, but may be used for either type except where it is obvious that the description is limited to one or the other type.

One essential object of my invention is to standardize insofar as possible the construction of electric motors and generators, or motor generator sets to thereby reduce the cost of production, increase the efficiency and enable one to interchange the various parts of the machine when it becomes necessary to do so with parts taken from other machines which may be made according to different specifications or for different ratings.

I also contemplate making the parts rugged, easily accessible and quickly interchangeable or replaceable, thereby producing an electric machine which is more to be desired than other machines on the market with which applicant is familiar.

In my co-pending application No. 472,391, filed August 1, 1930, for Enclosed ventilated motor, I have illustrated and claimed a cooling system, parts of which are incorporated in the devices I have illustrated herein and I do not intend to claim such subject matter of invention in my present application.

To illustrate my invention, I have shown on the drawings a motor consisting of six units. These units are the stator ring which is supported by two end brackets, which end brackets have bearing supports thereon; a rotor assembly which includes a rotor shaft, the rotor laminations and circulating fans; and two bearings for supporting the rotor assembly.

The stator is best illustrated in Figs. 3, 4, 5, 6 and 7 and comprises a plurality of laminations 1, arranged in abutting relation with each other to form a stator ring, this stator ring having the usual slots 2 spaced about the inner periphery thereof for the reception of the coils 3 in a well known manner. On opposite sides of the assembled laminations I place the clamping rings 4 and hold these clamping rings firmly against the laminations by any suitable clamping mechanism, while the tie bars 5 are each secured to both of the clamping rings 4 by welding the bars and clamping rings together as indicated at 6. During the welding operation the tie bars 5 become heated and consequently, after the weld has been made, the cooling down of the tie bars 5 will cause shrinkage thereof and will tend to draw the clamping ring 4 firmly against the opposite side of the stator ring to hold the stator laminations in assembled relation with each other. The tie bars may also be welded to the clamping rings at 7, and for a purpose which will appear as the description proceeds. The clamping rings 4 and tie bars 5 form a cage for the stator laminations and firmly hold the stator laminations so as to prevent shifting thereof relatively to each other.

The tie bars 5 are thereafter machined to form the surfaces 8 and 9, the former being a surface which is substantially cylindrical and concentric with the axis of the stator laminations, and the latter form abutment surfaces which are at right angles to the former. The function of these surfaces will appear presently.

It will be noted from an inspection of Figs. 5, 6 and 7 that with the same size clamping rings 4 and tie bars 5', the construction of the stator may be varied to suit the requirements of any particular machine. Thus, in Fig. 6 I have shown a lesser number of stator laminations than in Fig. 5 without changing the positions of the seats 8 and 9, or without changing the size of the clamping rings and tie bars. In Fig. 7 I have increased the number of stator laminations slightly and have also reduced the width of the annular portions of the stator laminations to allow for a larger rotor assembly.

The reason for this arrangement of the stator parts is for the purpose of standardizing the various units which make up a motor or like machine, thereby reducing the cost of making any particular machine and decreasing the number of different parts necessary to be made to produce machines of different ratings and for different purposes.

The stator ring assembly is next positioned between two end brackets 10, each of which are formed in substantially the same manner. The brackets are each provided with the thickened annular portions 11, machined to form the annular seats 12 and 13 which abut against the seats 8 and 9 respectively of the tie members 5, thus accurately locating the end brackets 10 with respect to the stator laminations. Bolts 13' extend through the openings in both brackets and have the nuts 15 thereon for drawing the seats on the end brackets into firm engagement with the seats on the stator. These bolts pass between adjacent tie bars 5 and are equally spaced about the axis of the motor as is illustrated in Fig. 2, although this is not a necessary arrangement. Due to the fact that the bolts are equally spaced about the axis of the motor makes it necessary to offset the tie bars 5 which lie close to the bolts 13'. These last mentioned tie bars however, are offset from their true symmetrical arrangement just enough to make room for the bolts so that when the end brackets are assembled each of the bolts will lie in close proximity to one of the tie bars and adjacent ones of the bolts will lie on opposite sides of the tie bars nearest to the bolts. This construction is clearly brought out in Fig. 2 and also in Fig. 4. This arrangement prevents the rotation of the stator with respect to the end brackets 10 in the event that the active elements of the motor tend to produce this result and in the event that the bolts 13' become loose enough to permit turning of the stator relative to the brackets 10. It will be noted that the weld at 7 is so arranged as to act as a brace for the tie bar in the event that the bolt and tie bar are forced against each other, if and when the stator tends to turn relative to the end brackets.

Each of the end brackets is provided with a plurality of inwardly extending arms 15 which carry the annular bearing support 16. The annular bearing support 16 has a perfectly true cylindrical inner surface which is uninterrupted by key slots or the like and is adapted to support either a roller bearing, a ball bearing or a sleeve bearing. In Fig. 1 I have illustrated a sleeve bearing in one bearing bracket and a ball bearing in the other bearing bracket. These support the rotor shaft 17 which has the bearing surfaces 18 and 19 thereon. I will now proceed to describe each of these bearings and the manner in which they are mounted in the bearing supports, and the manner in which they are made interchangeable, the one with the other.

Referring now more particularly to the drawings, it will be noted that the bearing and bearing support illustrated at the right in Fig. 1 is of the antifriction or ball bearing type. The ball bearing comprises an inner race 20 and an outer race 21 between which are interposed the balls 22 as in the usual ball bearing construction. The inner race 20 is press-fitted on the bearing portion 18 of the shaft 17. Before pressing the race 20 on the bearing surface 18, a ring 23 is placed over the bearing portion 18, and when the race is pressed onto the bearing portion 18, this ring 23 is brought into abutting relation with a shoulder 24 on the shaft 17 and held in that position by the race 20. This ring is what is known as a grease "slinger" and derives its name from the fact that as the shaft 17 rotates, any grease which contacts with the ring will be thrown outwardly and for a purpose which will appear presently. Against the outer side of the race 21, I arrange the bearing cap 25 which has an annular portion fitting within the annular bearing support 16 to center the bearing cap with respect to the shaft. A primary grease seal 27 closes one end of the space between the races 20 and 21, and is held in position by being secured to one or the other of the races.

On the other side of the ball bearing I arrange a bearing cap 28 which has the annular portion 29 arranged within the bearing support 16 to center the bearing cap with respect to the bearing support. Bolts 129 hold the bearing caps 25 and 28 against the opposite sides of the bearing support 16. The bearing cap 28 is provided with a grease inlet 30 and the inner bearing cap 28 is large enough to contain a large supply of grease so as not to require a replenishing of the same except after a long period of use, there being a secondary grease retaining ring 34 disposed in the joint between the cap 28 and the support 16.

In the bearing just described, the grease "slinger" 23, secondary grease retaining ring 34, primary grease retaining ring 27 and bearing caps 25 and 28 effectively retain the grease and prevent the same from working out onto the motor parts which are outside of the bearing caps.

Another advantage of the grease retaining means which I have disclosed is that bearings may be partially dismantled or the motor itself may be partially dismantled without exposing the bearing to foreign matter thereby maintaining the grease in perfect condition for lubrication, it being well understood that it is extremely objectionable to have foreign matter in the lubricating grease for the motor. In order to accomplish this result, I provide an annular groove 36 in the shaft 17 and I provide a substantially triangular spring clip 37 which is snapped into the groove 36 so that a portion of each of the three sides thereof is arranged within the groove 36. While I have illustrated the motor in Fig. 1 as being provided at the left with a sleeve bearing for the shaft, it will be understood, of course, that the ball bearing shown at the right in that figure could be duplicated at the left as the annular bearing supports 16 have the same internal diameter.

The shaft 17 has a plurality of rotor laminations 38 press-fitted on the shaft 17 and keyed thereto by means of the key 39. The outer peripheries of the rotor laminations are provided with slots in which are arranged the stator bars 40 which are tied together by means of the rings 41 and in a well known manner. The shaft 17 also carries a plurality of fans 42, one on each side of the rotor laminations and within the end brackets 10, these being secured to the shaft by means of the set screws 43.

The bearing shown at the left in Fig. 1 is a sleeve bearing and comprises an annular portion 48 notched at 49 to provide a lubricant passage. The bearing also has a sleeve portion 51 connected to the annular rim portion 48 by means of the web portions 53 at the point where the notches 49 are formed. The sleeve is lined with an antifriction lining 54 and this antifriction lining receives the bearing portion 19 of the shaft 17. Outer end inner bearing caps 55 and 56 enclose the sleeve 51 and are for the purpose of protecting the sleeve bearing and the bearing surfaces. It will be understood that if desired, suitable gaskets may be interposed between the bearing caps and the bearing support 16 in order to more effectively prevent the lubricant from coming out of the housing formed by the bearing caps and the bearing support. The bearing caps are held in place by means of the bolts 57 and a lubricant receiving cup may be provided on the bearing cap 55.

The sleeve bearing and its lining are notched at 60' so as to expose a portion of the shaft 17. The ring 61' surrounds the shaft and sleeve bearing and rests on the exposed portion of the shaft 17. The lubricant delivered to the bearing collects at the bottom of the housing formed by the bearing caps and bearing support, and as the shaft rotates, the ring is caused to rotate therewith. As the ring rotates, the oil is carried from the bottom of the lubricant reservoir onto the shaft by means of the ring. This lubricant gradually works in between the lining 54 and the bearing surface 19 on the shaft 17. A drain plug may be provided on the bearing cap, and this is removed whenever it is desired to drain lubricant from the reservoir within the bearing caps.

The bearing caps 55 and 56 are provided with the annular portions 66 and 67 respectively, and these fit snugly within the cylindrical opening in the bearing support 16. The distance between the annular portions 66 and 67 is substantially the same as the width of the rim portion 48 of the sleeve bearing so that when the sleeve bearing is in place any substantial longitudinal movement of the same is prevented. A small amount of clearance is preferably provided between these parts in Fig. 15.

With this arrangement, if the motor is supported on the floor, the feet 70 of the end brackets 10 will be horizontal, and the bearing cap 55 will bear the relation shown in Fig. 1 to the rest of the motor. However, if the motor were assembled as shown in Fig. 1 and it were desired to support the motor on a ceiling bracket upside down, then the lubricating means for the bearing would not be in proper position as it is desired to always maintain the notch 60' at the top or above the bearing to be lubricated. If the motor shown in Fig. 1 is to be used on the ceiling, then the bolts 57 are removed and the bearing cap 55 rotated through 180°, and the bolts 57 again inserted in their proper places.

With the construction which I have just described, it is quite clear that the motor bearing support 16 may be equipped with any type of bearing which may be desired, and therefore standard bearings, both sleeve and anti-friction ball and roller bearings may be provided with the same outside diameters so as to be rendered interchangeable. The inner diameters of these bearings would also conform to various sizes of shafts which may be desired, although even with respect to the shafts, it may be found desirable to use a standard size shaft for motors having a certain rating or capacity.

With the sleeve bearing shown, it will be noted that the shaft is provided with a recess 71 which forms a tapered annular rib 72. This rib 72 tends to pick up any of the lubricant which has a tendency to move along the shaft toward the inner bearing cap 56 and throw the same outwardly against the bearing cap from whence it travels downwardly along the bearing cap into the oil reservoir. The notch 49 is provided for the purpose of permitting the oil to drain from right to left as viewed in Fig. 1. Air circulating fans may be fastened on the shaft by the members 43 and operate to direct a draft of air axially in through openings in the end pieces surrounding the bearings and discharge the air radially into the channels 14 formed by the end pieces, the air being directed through the channels 14 onto the windings.

In my co-pending application, Serial No. 528,580, filed April 8, 1931, for Journal construction, I have illustrated and claimed bearings such as are incorporated in the device I have illustrated herein, and I do not intend to claim such subject matter of invention in my present application.

Throughout the several views shown in this application the same reference characters refer to the same or similar parts used in the various constructions so as to give a better idea as to the interchangeability of the various parts.

From the description it will be seen that the various parts of my invention are made interchangeable for various types of motors and generators and generator sets, thereby eliminating the necessity of providing a great number of parts constructed according to different specifications.

Obviously other changes may be made in the construction and in the arrangement of parts without departing from the spirit of this invention, and therefore I do not wish to limit my invention except as set forth in the appended claims.

Having thus fully described a preferred embodiment of my invention, what I desire to secure by Letters Patent of the United States is:

1. A motor comprising end brackets, a stator ring comprising circularly arranged tie bars, clamping rings securing the tie bars together to form a cage and a plurality of laminations held in position with respect to each other by and within the cage formed by the tie bars and clamping rings, and a plurality of clamping bolts extending through said brackets to clamp said stator ring therebetween, said clamping bolts extending adjacent certain of said tie bars to prevent rotation of said stator ring relative to said brackets.

2. In a dynamo electric machine, the combination with a pair of opposed end brackets, a stator assembly comprising laminations and a cage enclosing the laminations to hold them in place, said cage comprising circularly arranged bars and connecting members secured to the bars to maintain them in their spaced circular arrangement, said bars cooperatively engaging said brackets to center the cage with respect to the brackets and clamping means to secure the brackets on opposite sides of the cage.

3. In a dynamo electric machine, the combination with a pair of opposed end brackets, a stator assembly comprising laminations and a cage enclosing the laminations to hold them in place, said cage comprising circularly arranged bars and connecting members secured to the bars to maintain them in their spaced circular arrangement, said bars cooperatively engaging said brackets to center the cage with respect to the brackets and rods extending between the end brackets adjacent certain of said bars, the opposite sides of said bars from said rods having a welded fillet securing the bar to the laminations forming said stator.

4. A stator assembly comprising a laminated ring and a cage for supporting the ring, said cage comprising retaining bars spaced about the periphery of the laminated ring and retaining rings disposed on opposite sides of the laminated ring and welded to the retaining bars, said bars projecting at their opposite ends beyond the outwardly facing surfaces of the retaining rings and having their projecting portions finished, and end brackets adapted to seat upon the projecting finished ends of said retaining bars, said end brackets forming seats to receive the finished ends of the bars and means to secure the end brackets in place.

FRANK ADAMS.